J. H. SPRINGER.
BRAKE.
APPLICATION FILED JAN. 15, 1915.

1,203,426.

Patented Oct. 31, 1916.

Witnesses
W. May. Duvall
J. F. Byrne

Inventor
J. H. Springer,
By
Attorney

UNITED STATES PATENT OFFICE.

JOHN H. SPRINGER, OF GLENDALE, CALIFORNIA.

BRAKE.

1,203,426.        Specification of Letters Patent.        Patented Oct. 31, 1916.

Application filed January 15, 1915. Serial No. 2,413.

*To all whom it may concern:*

Be it known that I, JOHN H. SPRINGER, a citizen of the United States, residing at Glendale, in the county of Los Angeles and State of California, have invented certain new and useful Improvements in Brakes; and I do hereby declare the following to be a full, clear, and exact description of the invention, such as will enable others skilled in the art to which it appertains to make and use the same.

This invention relates to brakes and more particularly to band brakes and has for its object to provide a novel and efficient device for operating the brake band.

Another object is the provision of an operating means for brake bands which shall be positive and efficient in operation and which shall be applicable to various types of brakes such as vehicle brakes, machine brakes and the like.

Figure 1:
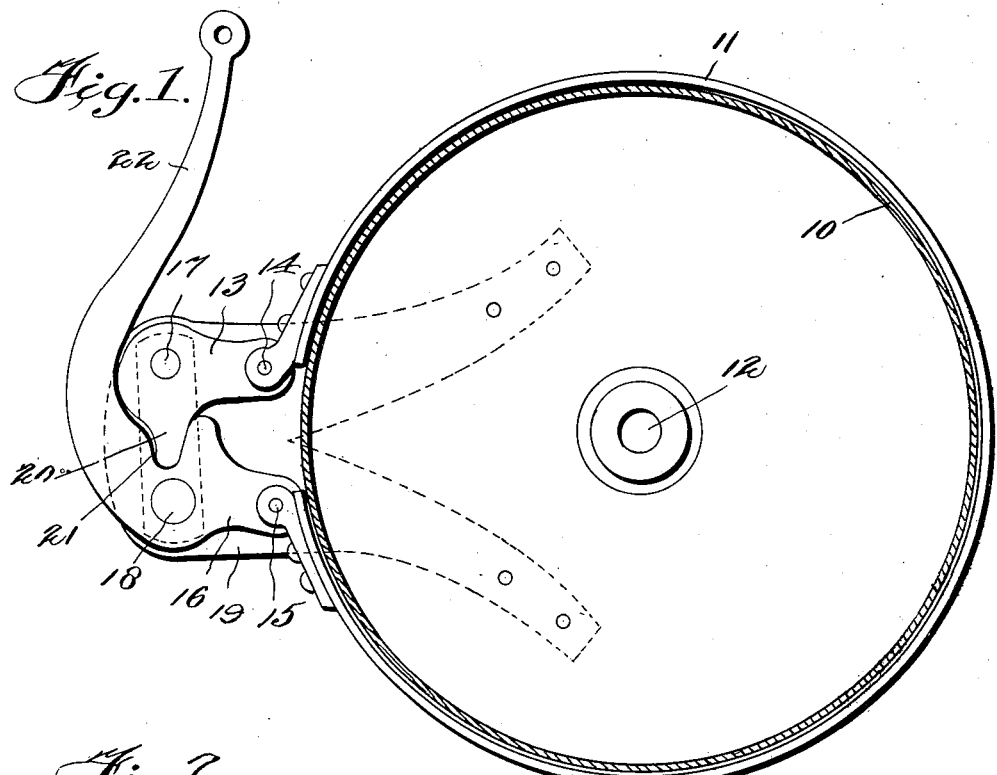
Figure 2:
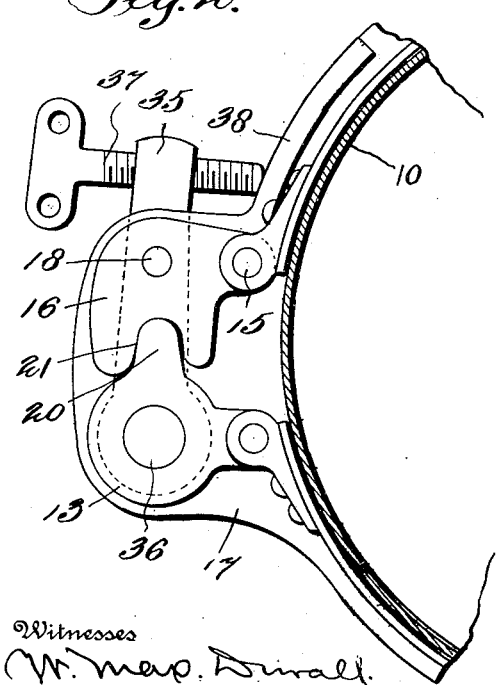

With these and other objects in view, the invention consists in the novel construction, arrangement and formation of parts as will be hereinafter specifically described, claimed and illustrated in the accompanying drawing, in which:

Figure 1 represents a side elevation of a brake constructed in accordance with the invention. Fig. 2 represents a side elevation, of a modified type of the brake.

Referring to the drawing in detail, wherein similar reference numerals designate corresponding parts throughout the several views, the numeral 10 in Fig. 1 indicates a cylindrical brake drum of the usual or any preferred construction around which is positioned the brake band 11 adapted to frictionally engage the drum 10 to retard the movement of the shaft 12 on which the drum is mounted. An operating member 13 is provided with a pin 14 pivotally securing one end of the band 11 and the opposite end of the latter is pivotally secured upon a pin 15 carried by the other operating member 16. The members 13 and 16 are pivotally secured at 17 and 18, respectively, to a suitable supporting bracket 19. The member 13 is formed with a tooth 20 projecting radially from the pivotal axis 17 thereof and positioned within a recess 21 in the member 16, whereby rotary motion of the member 16 is imparted to the member 13 to contract or expand the band 11 as desired. A curved operating arm 22 is formed integral with the member 16 and is adapted to be connected with a suitable operating mechanism (not shown). The arm 22 is so arranged as to engage the member 13 and thus limit the expanding movement of the brake band 11.

In Fig. 2, the operating arm or lever 35 is connected with the pivot pin 36 of the toothed member 13 and the free end of the arm 35 is formed with a threaded opening receiving an adjusting screw 37 adapted to engage an angularly directed portion 38 of the supporting bracket 17 whereby the expanding movement of the brake band may be adjustably limited.

What I claim is:

In a brake, a drum, a band adapted for frictional engagement with said drum, a recessed member secured to one end of said band, a member secured to the opposite end of said band, a tooth carried by the second mentioned member engaged within the recess of the first member, and an arm carried by one of said members and adapted to engage the other member to limit the expanding movement of said band.

In testimony whereof I affix my signature in presence of two witnesses.

JOHN H. SPRINGER.

Witnesses:
   THOMAS R. BERRY,
   CLAUDIA E. SPRINGER.